US012621484B2

(12) United States Patent
Tian et al.

(10) Patent No.: US 12,621,484 B2
(45) Date of Patent: May 5, 2026

(54) SIGNALING DUPLICATED VERTICES REMOVAL IN MESH MOTION VECTOR CODING

(71) Applicant: TENCENT AMERICA LLC, Palo Alto, CA (US)

(72) Inventors: Jun Tian, Palo Alto, CA (US); Shan Liu, San Jose, CA (US); Xiaozhong Xu, State College, PA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 64 days.

(21) Appl. No.: 18/602,832

(22) Filed: Mar. 12, 2024

(65) Prior Publication Data

US 2024/0314353 A1     Sep. 19, 2024

Related U.S. Application Data

(60) Provisional application No. 63/451,888, filed on Mar. 13, 2023.

(51) Int. Cl.
H04N 19/54          (2014.01)
H04N 19/105         (2014.01)
(Continued)

(52) U.S. Cl.
CPC ........... H04N 19/54 (2014.11); H04N 19/105 (2014.11); H04N 19/159 (2014.11); H04N 19/172 (2014.11)

(58) Field of Classification Search
CPC ............................. H04N 19/54; H04N 19/105
See application file for complete search history.

(56) References Cited

U.S. PATENT DOCUMENTS 6,047,088 A * 4/2000 van Beek ............... H04N 19/46
                                                         375/E7.11
10,404,990 B2 * 9/2019 Hendry .................. H04N 19/51
                      (Continued)

OTHER PUBLICATIONS

Jainfeng Xu, et al., "On improving motion vector coding by integrating duplicated vertices in reference frames," KDDI Corp., International Organisation for Standardisation Organisation Internationale De Normalisation ISO/IEC JTC 1/SC 29/WG 7 Coding of Moving Pictures and Audio, Oct. 2022, ISO/IEC JTC 1/SC 29/WG 7, m61048, pp. 1-5 (5 pages total).

(Continued)

*Primary Examiner* — Irfan Habib
(74) *Attorney, Agent, or Firm* — Sughrue Mion, PLLC

(57) ABSTRACT

A method of decoding a dynamic mesh sequence, the method includes: receiving a coded bitstream comprising the dynamic mesh sequence in a first frame and a second frame that occurs later than the first frame; reconstructing the dynamic mesh in the first frame; determining whether a duplicate vertex removal mode is enabled in which a motion vector of a vertex in the dynamic mesh second that is a duplicate of a vertex in the dynamic mesh sequence in the first frame; based on determining that the duplicate vertex removal mode is enabled, decoding a motion vector for each vertex in the second frame that is not a duplicate of a vertex in the reconstructed first frame; and reconstruct the dynamic mesh sequence in the second frame using the reconstructed dynamic mesh in the first frame and each decoded motion vector.

15 Claims, 8 Drawing Sheets

(51) Int. Cl.
    *H04N 19/159*     (2014.01)
    *H04N 19/172*     (2014.01)

(56)             References Cited

U.S. PATENT DOCUMENTS

| | | | |
|---|---|---|---|
| 11,582,469 B2 * | 2/2023 | Zhang | H04N 19/20 |
| 2019/0197739 A1 * | 6/2019 | Sinharoy | G06T 9/00 |
| 2021/0218994 A1 * | 7/2021 | Flynn | G06T 9/001 |
| 2023/0162403 A1 * | 5/2023 | Tian | G06T 9/001 |
| 2023/0162404 A1 * | 5/2023 | Tian | G06T 9/00 |
| | | | 345/420 |
| 2023/0164324 A1 * | 5/2023 | Zhao | H04N 19/52 |
| | | | 375/240.02 |
| 2023/0164351 A1 * | 5/2023 | Zhao | H04N 19/52 |
| 2024/0022766 A1 * | 1/2024 | Ahn | G06T 7/20 |
| 2024/0137558 A1 * | 4/2024 | Budagavi | H04N 19/54 |
| 2024/0430467 A1 * | 12/2024 | Kalva | H04N 19/132 |
| 2025/0024068 A1 * | 1/2025 | Joshi | H04N 19/105 |

OTHER PUBLICATIONS

International Search Report issued Jun. 17, 2024 in International Application No. PCT/US 24/19688.
Written Opinion issued Jun. 17, 2024 in International Application No. PCT/US 24/19688.

* cited by examiner

400

| | Descriptor |
|---|---|
| motion_vector_decoding ( vertexCount ) { | |
| duplicate_removal_mode = reference_frame_statistics_calculation () | |
| if ( duplicate_removal_mode ) { | |
| decode_indices_of_non_skippable_duplicates () | |
| for ( i = 0; i < vertexCount; i++ ) { | |
| if ( v[i] is NOT skippable duplicate) { | |
| decode_motion_vector [i] | |
| } | |
| } | |
| } else { | |
| for ( i = 0; i < vertexCount; i++ ) { | |
| decode_motion_vector [i] | |
| } | |
| } | |
| } | |

| | Descriptor |
|---|---|
| motion_vector_decoding ( vertexCount ) { | |
| duplicate_removal_mode | u(1) |
| if ( duplicate_removal_mode ) { | |
| decode indices of non_skippable_duplicates () | |
| for ( i = 0; i < vertexCount; i++ ) { | |
| if ( v[i] is NOT skippable_duplicate ) { | |
| decode_motion_vector [i] | |
| } | |
| } | |
| } else { | |
| for ( i = 0; i < vertexCount; i++ ) { | |
| decode_motion_vector [i] | |
| } | |
| } | |

FIG. 5

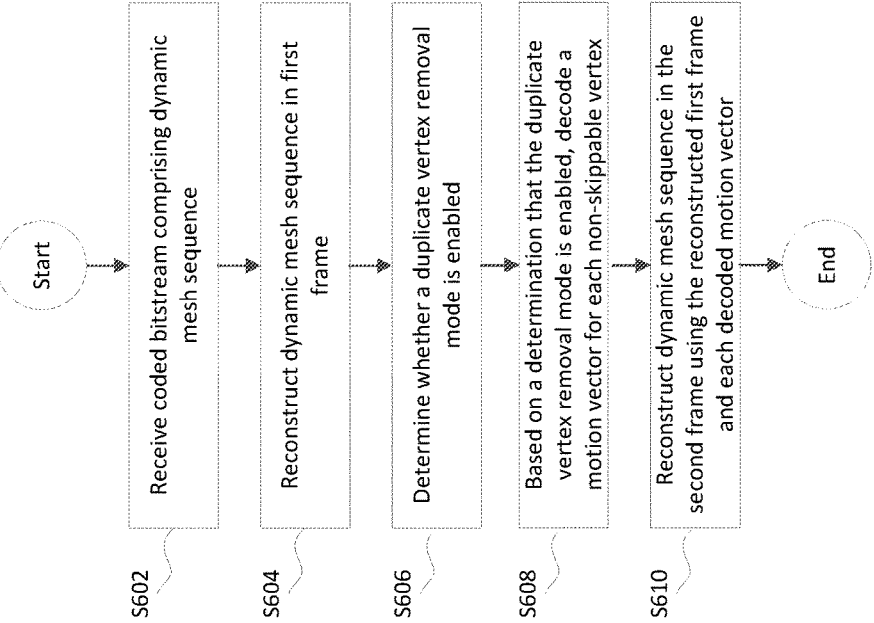

Start

S602 — Receive coded bitstream comprising dynamic mesh sequence

S604 — Reconstruct dynamic mesh sequence in first frame

S606 — Determine whether a duplicate vertex removal mode is enabled

S608 — Based on a determination that the duplicate vertex removal mode is enabled, decode a motion vector for each non-skippable vertex S610 — Reconstruct dynamic mesh sequence in the second frame using the reconstructed first frame and each decoded motion vector End

SIGNALING DUPLICATED VERTICES REMOVAL IN MESH MOTION VECTOR CODING

CROSS-REFERENCE TO RELATED APPLICATION

This application claims priority from U.S. Provisional Application No. 63/451,888 filed on Mar. 13, 2023, the disclosure of which is incorporated herein by reference in its entirety.

FIELD

This disclosure is directed to a set of advanced video coding technologies. More specifically, the present disclosure is directed to signaling duplicated vertices removal in mesh motion vector coding.

BACKGROUND

The advances in 3D capture, modeling, and rendering have promoted the ubiquitous presence of 3D contents across several platforms and devices. Nowadays, it is possible to capture a baby's first step in one continent and allow the grandparents to see (and maybe interact) and enjoy a full immersive experience with the child in another continent. Nevertheless, in order to achieve such realism, models are becoming ever more sophisticated, and a significant amount of data is linked to the creation and consumption of those models. 3D meshes are widely used to represent such immersive contents.

A mesh is composed of several polygons that describe the surface of a volumetric object. Each polygon is defined by its vertices in 3D space and the information of how the vertices are connected, referred to as connectivity information. Optionally, vertex attributes, such as colors, normals, etc., could be associated with the mesh vertices. Attributes could also be associated with the surface of the mesh by exploiting mapping information that parameterizes the mesh with 2D attribute maps. Such mapping is usually described by a set of parametric coordinates, referred to as UV coordinates or texture coordinates, associated with the mesh vertices. 2D attribute maps are used to store high resolution attribute information such as texture, normals, displacements etc. Such information could be used for various purposes such as texture mapping and shading.

A dynamic mesh sequence may require a large amount of data since it may consist of a significant amount of information changing over time. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. MPEG is planning to develop a new mesh compression standard to directly handle dynamic meshes with time varying connectivity information and optionally time varying attribute maps. This standard targets lossy, and lossless compression for various applications, such as real-time communications, storage, free viewpoint video, AR and VR. Functionalities such as random access and scalable/progressive coding are also considered.

Mesh geometry information consists of vertex connectivity information, 3D coordinates, and 2D texture coordinates, etc. The compression of vertex 3D coordinates, which is also called vertex position, is very important, as in most cases, it takes up significant portion of the entire geometry related data.

SUMMARY

According to one or more embodiments, a method of decoding a dynamic mesh sequence, comprises: receiving a coded bitstream comprising the dynamic mesh sequence in a first frame and a second frame that occurs later than the first frame; reconstructing the dynamic mesh in the first frame; determining whether a duplicate vertex removal mode is enabled in which a motion vector of a vertex in the dynamic mesh second that is a duplicate of a vertex in the dynamic mesh sequence in the first frame; based on determining that the duplicate vertex removal mode is enabled, decoding a motion vector for each vertex in the second frame that is not a duplicate of a vertex in the reconstructed first frame; and reconstruct the dynamic mesh sequence in the second frame using the reconstructed dynamic mesh in the first frame and each decoded motion vector.

According to one or more embodiments, a method of encoding a dynamic mesh comprises: receiving a first frame comprising the dynamic mesh sequence and a second frame comprising the dynamic mesh sequence, the second frame occurring after the first frame; determining a motion vector between each vertex of the dynamic mesh sequence in the first frame and a corresponding vertex of the dynamic mesh sequence in the second frame; generating a coded bitstream that includes each determined motion vector, an indication whether a vertex of the dynamic mesh sequence in the second frame is a duplicate of a vertex of the dynamic mesh sequence in the first frame, and an indication whether a duplicate vertex removal mode is enabled in which a motion vector of a vertex in the dynamic mesh sequence of the second frame that is a duplicate of a vertex in the dynamic mesh sequence in the first frame is skipped in a reconstruction of the second frame.

According to one or more embodiments, a method of processing a dynamic mesh sequence, comprises reconstructing a dynamic mesh sequence in a second frame that occurs after the first frame based on a coded bitstream that includes the first frame and the second frame, wherein the first frame is reconstructed, wherein the coded video bitstream includes an indication of whether a duplicate vertex removal mode is enabled in which a motion vector of a vertex in the dynamic mesh second that is a duplicate of a vertex in the dynamic mesh sequence in the first frame, wherein based on determining that the duplicate vertex removal mode is enabled, a motion vector for each vertex in the second frame that is not a duplicate of a vertex in the reconstructed first frame is decoded, and wherein the dynamic mesh sequence in the second frame is reconstructed using the reconstructed first frame and each decoded motion vector.

BRIEF DESCRIPTION OF THE DRAWINGS

Further features, the nature, and various advantages of the disclosed subject matter will be more apparent from the following detailed description and the accompanying drawings in which:

FIG. 4 illustrates an example decoder process for decoding a dynamic mesh sequence with a duplicate removal mode, in accordance with embodiments of the present disclosure.

FIG. 5 illustrates an example decoder process for decoding a dynamic mesh sequence with a duplicate removal mode, in accordance with embodiments of the present disclosure.

FIG. 6 illustrates a flowchart of a process performed by a decoder, in accordance with embodiments of the present disclosure.

DETAILED DESCRIPTION

Figure 1:
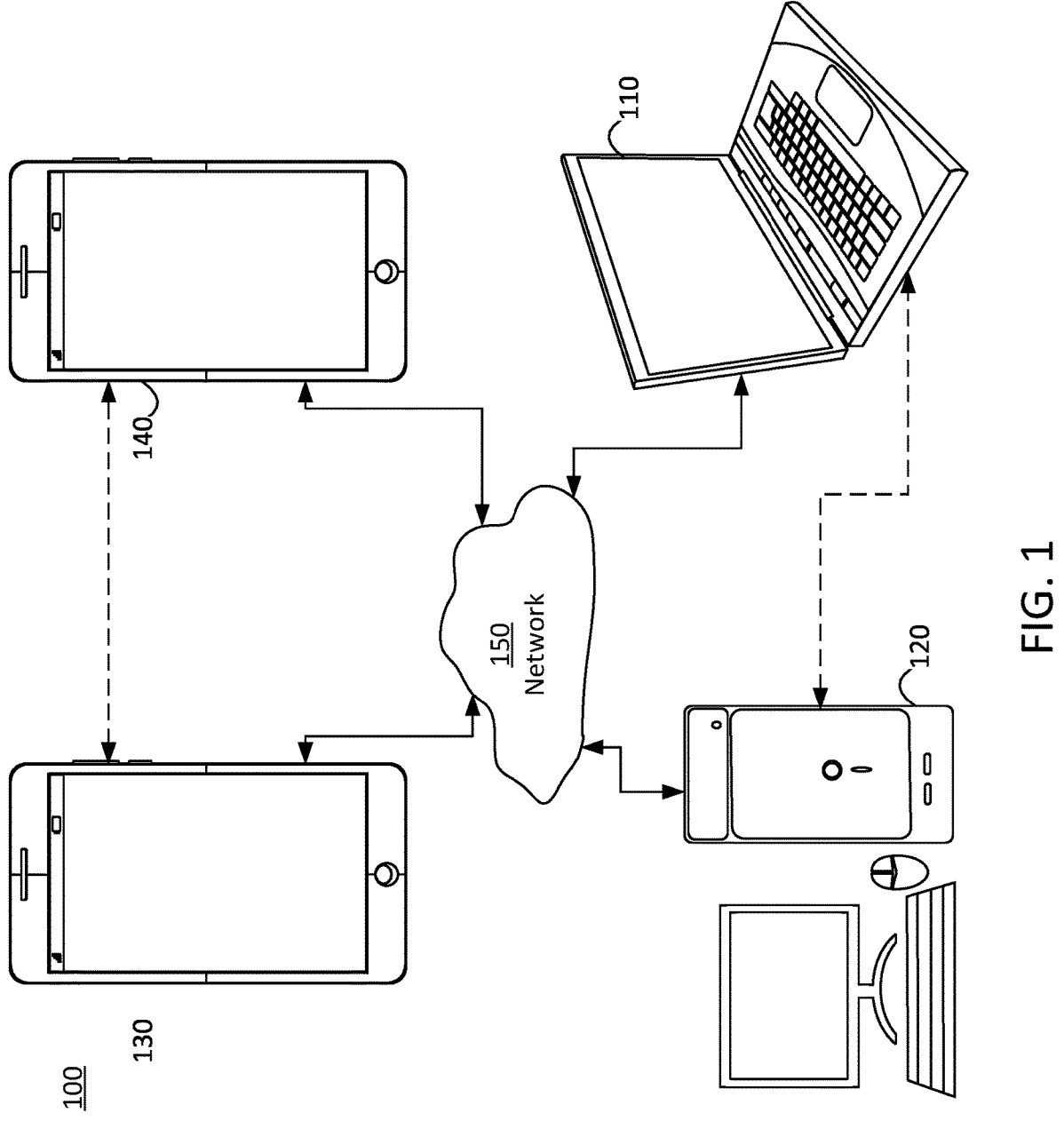
FIG. 1 is a schematic illustration of a block diagram of a communication system, in accordance with embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Figure 2:
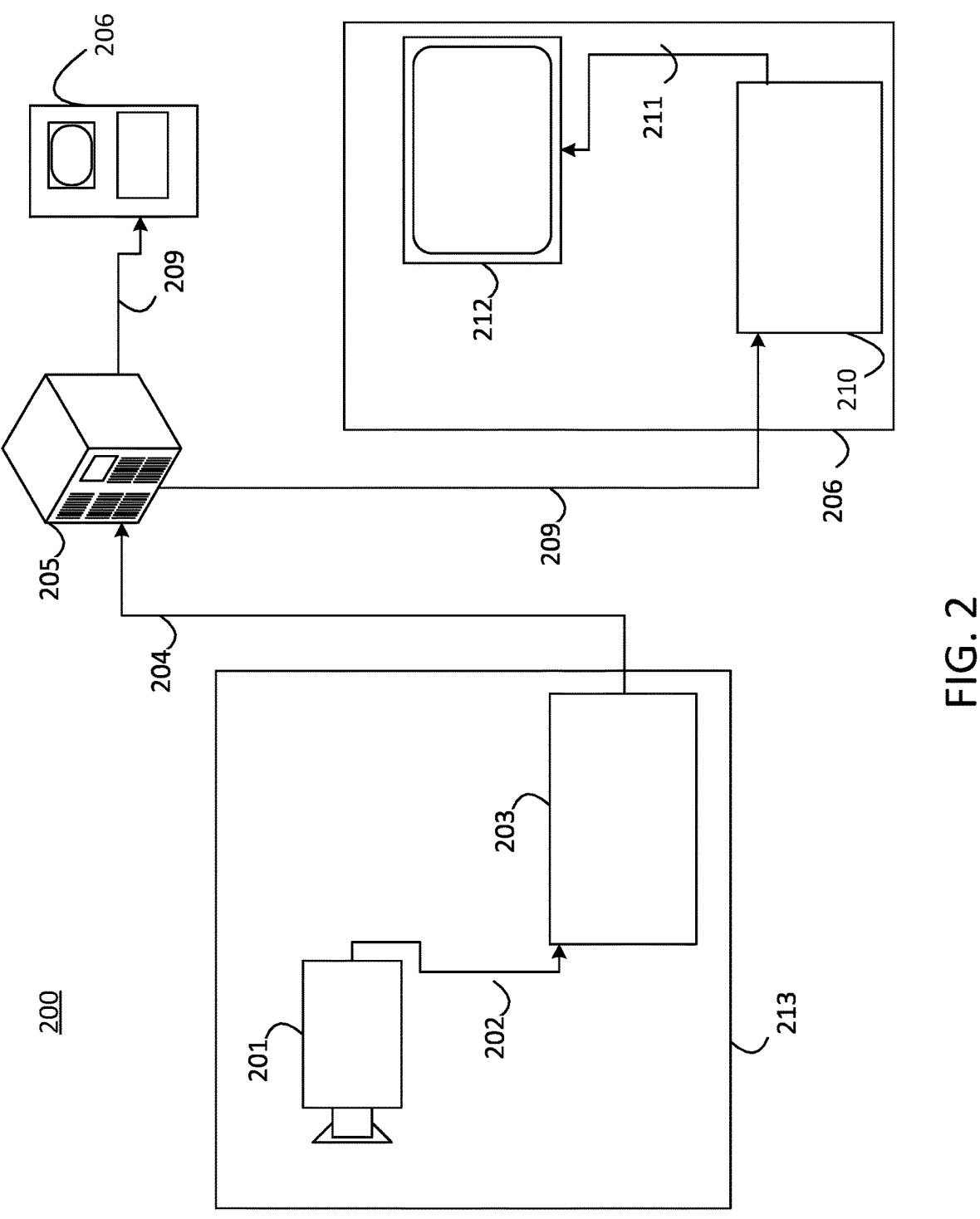
FIG. 2 is a schematic illustration of a block diagram of a streaming system, in accordance with embodiments of the present disclosure.

With reference to FIGS. 1-2, one or more embodiments of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have a lower data volume when compared to the uncompressed stream 202, may be stored on a streaming server 205 for future use. One or more streaming clients 206 may access the streaming server 205 to retrieve video bit streams 209 that may be copies of the encoded video bitstream 204.

The streaming clients 206 may include a video decoder 210 and a display 212. The video decoder 210 may, for example, decode video bitstream 209, which is an incoming copy of the encoded video bitstream 204, and create an outgoing video sample stream 211 that may be rendered on the display 212 or another rendering device. In some streaming systems, the video bitstreams 204, 209 may be encoded according to certain video coding/compression standards.

According to one or more embodiments, a dynamic mesh sequence M at a time instance t as M(t). M(t) may be called a positionally tracked frame, if there is a one-to-one mapping f from the vertex positions of M(t) to the vertex positions at another time instance M(t$_0$), where t and t$_0$ are different time instances. M(t$_0$) may be called a reference frame, and the corresponding vertices in the reference frame as the reference vertices.

For a positionally tracked frame and the corresponding reference frame, a vertex position difference between the mapped vertices in the two frames is represented by a motion vector (MV). In the MV coding, a residual MV is derived from the prediction using the neighboring decoded MVs.

The following two facts make it possible to improve the motion vector coding. First, there are duplicated vertices in the decoded meshes of reference frames. A pair of duplicated vertices (A, A') may be defined as two vertices in a decoded mesh frame who have the same position but different vertex indexes. Let A be the previous vertex than A' in the encoding/decoding order. Vertex A is called as an earlier vertex and vertex A' is called as a later vertex. Second, the MVs of duplicated vertices A and A' may be exactly same in most of cases. Some motion vector coding methods based on integrating duplicated vertices integrates the k-th pair (A$_k$, A$_k$':k=1, . . . , K) of duplicated vertices into one single vertex A$_k$ (e.g., called as integrated vertex) and update the connectivity in the decoded mesh of reference frame. Because of the integration of duplicated vertices, this method further updates the 1-to-1 mapping between the inter-frame and its reference frame at the encoder, which reduces the number of MVs. On the other hand, there are some integrated vertices that have multiple MVs after integration of duplicated vertices. Therefore, this method signals the total number and all indexes of extra MVs that come from those multiple MVs. If an integrated vertex A$_k$ has N$_k$ (N$_k$>1) MVs, its number and index of extra MVs are (N$_k$−1) and k, respectively. The total number of extra MVs is $$\sum_{k=1}^{K} N_k.$$

As a result, there are duplicated vertices and non-duplicated vertices in the decoded mesh before integration. After integration, the integrated vertices may have single MVs (e.g., the vast majority) or multiple MVs.

Embodiments of the present disclosure are directed to methods and systems to signal duplicated vertices removal in mesh motion vector coding. The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

The embodiments of the present disclosure are directed to methods and systems for mesh motion vector coding. The embodiments of the present disclosure may be applied individually or by any form of combinations.

For a vertex V in a positionally tracked frame M(t), the neighbors are vertices that are connected to V through edges, and these vertices are called neighbor vertices of V. For a positionally tracked frame M(t) and its reference frame M(t$_0$), in one or more examples, f is the mapping between vertex positions of M(t) and M(t$_0$). Given a vertex V in M(t), V may be a duplicate vertex if there is a coded vertex $\bar{V}$ in M(t) such that their reference vertices, f(V) and f($\bar{V}$), have the same position values. A coded vertex implies that the coding order of $\bar{V}$ comes prior to V. Assume subscripts x, y, z denoting 3D coordinates in the xyz space, then for a duplicate vertex V, we have (f(V))$_x$=(f($\bar{V}$))$_x$, (f(V))$_y$=(f($\bar{V}$))$_y$, and (f(V))$_z$=(f($\bar{V}$))$_z$;

In one or more examples, for a duplicate vertex V, V is a skippable duplicate if V and $\bar{V}$ have the same position values, V$_x$=$\bar{V}_x$, V$_y$=$\bar{V}_y$, and V$_z$=$\bar{V}_z$; otherwise, V is a non-skippable duplicate.

Figure 3:
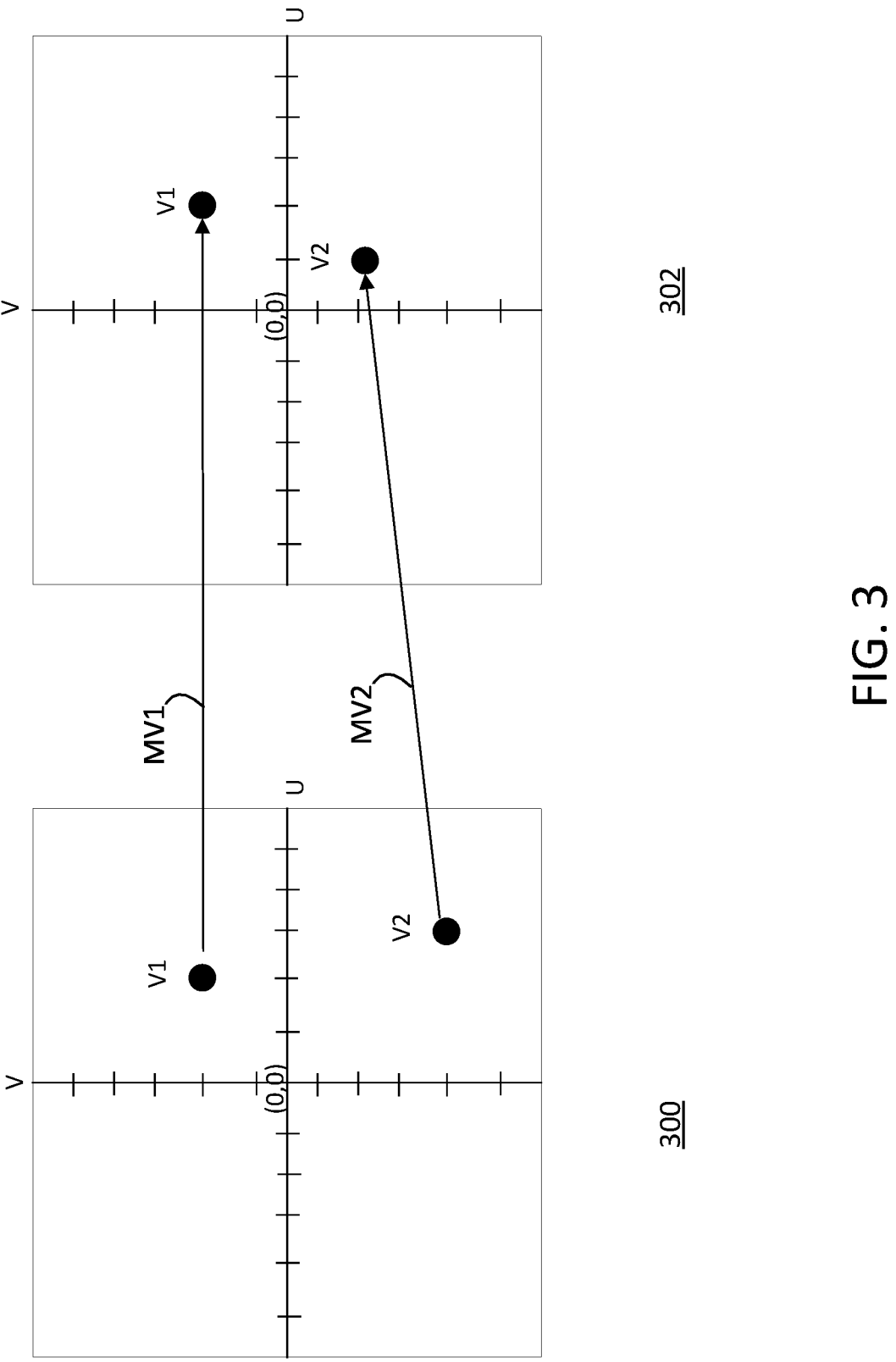
FIG. 3 illustrates an example of a dynamic mesh sequence in different frames, in accordance with embodiments of the present disclosure.

FIG. 3 illustrates an example of two frames 300 and 302. Frame 302 may be a positionally tracked frame and frame 300 may be a reference frame that occurs before frame 302. The frames include vertices V1 and V2 that may be part of a dynamic mesh sequence. The motion vector MV1 is a motion vector between the vertex V1 in frames 300 and 302. The motion vector MV2 is a motion vector between the vertex V2 in frames 300 and 302. As illustrated in in FIG. 3, vertex V1 in frames 300 and 302 have the same UV coordinates (2,2), and vertex V2 in frames 300 and 302 have different UV coordinates (3, −3) and (1, −2), respectively. Accordingly, the vertex V1 in frames 300 and 302 may be considered a duplicate vertex. Although FIG. 3 illustrates a UV coordinate system, as understood by one of ordinary skill in the art, vertices in a mesh may have any suitable coordinate system known to one of ordinary skill in the art.

According to one or more embodiments, statistics of vertices of a reconstructed reference frame may be calculated. Based on the statistics, a duplicate vertices removal mode may be turned on or off. A duplicate removal mode may be used to turning on or off the processing duplicate vertices removal. For example, when the duplicate vertices removal is turned on, indices of all non-skippable duplicates (or equivalently, indices of all skippable duplicates) are coded and transmitted to the decoder. Subsequently, motion vectors of non-skippable duplicates and motion vectors of non-duplicate vertices are coded and transmitted to the decoder. In one or more examples, when the duplicate vertices removal is turned off, motion vectors of all vertices are coded and transmitted to the decoder.

FIG. 4 illustrates a syntax 400 of a process performed by a decoder that receives a coded bitstream including a dynamic mesh sequence. As illustrated in the syntax 400, a duplicate_removal_mode flag is set based on calculated statistics (e.g. reference_frame_statistics_calculation( )). For example, a reference frame in the coded bitstream may be reconstructed. A statistical calculation may be performed to determine a percentage of vertices in the reconstructed reference frame that is a duplicate with vertices in another frame. For example, in the coded bitstream, each vertex in the reference frame may be associated with a flag indicating whether a vertex is a duplicate vertex. Based on the statistical calculation, the percentage of vertices that are a duplicate vertex may be determined. For example, if the reference frame includes 1000 vertices, and 50 vertices are marked as duplicate vertices, the percentage of vertices that are duplicates is 5%. The determined percentage of vertices that are duplicates may be compared with a threshold (e.g., 2%), and if the determined percentage is greater than or equal to the threshold, the duplicate_removal_mode flag be set to a TRUE value indicating that the duplicate removal mode is enabled.

If the duplicate removal mode is enabled (e.g., duplicate_removal_mode=TRUE or 1), than for a positionally tracked frame, the motion vectors of vertices that are not skippable (e.g., non-duplicate vertices) are decoded. If the duplicate removal mode is not enabled (e.g., duplicate_removal_mode=FALSE or 0), than for a positionally tracked frame, the motion vector of each vertex is decoded.

FIG. 5 illustrates a syntax 500 of a process performed by a decoder that receives a coded bitstream including a dynamic mesh sequence. Compared to the syntax 400 in FIG. 4, the syntax 500 may process a coded bitstream in which the value of the duplicate_removal_mode is explicitly signaled. For example, the coded bitstream may specify the duplicate_removal_mode as one of: (i) TRUE or 1; or (ii) FALSE or 0.

FIG. 6 illustrates a flowchart of an example process 600 performed by a decoder. In one or more examples, the process 600 may be performed by the decoder 210 (FIG. 2).

The process 600 may start at operation S602 where a coded bitstream comprising a dynamic mesh sequence in first and second frames. For example, the coded bitstream may include a dynamic mesh sequence included in a reference frame (e.g., frame 300) and a positionally tracked frame (302).

The process proceeds to operation S604 where the dynamic mesh sequence in the first frame is reconstructed.

For example, the reference frame included in the coded bitstream (e.g., frame 300) may be reconstructed.

The process proceeds to operation S606, where a determination is made whether the duplicate vertex removal mode is enabled. For example, the determination whether the duplicate vertex removal mode is enabled may be performed in accordance with syntax 400 (FIG. 4) or (FIG. 5).

The process proceeds to operation S608, where based on a determination that the duplicate vertex removal mode is enabled, a motion vector for each non-skippable vertex in the second frame is decoded. The process proceeds to operation S610 where a the dynamic mesh sequence in the second frame using the reconstructed first frame.

Figure 7:
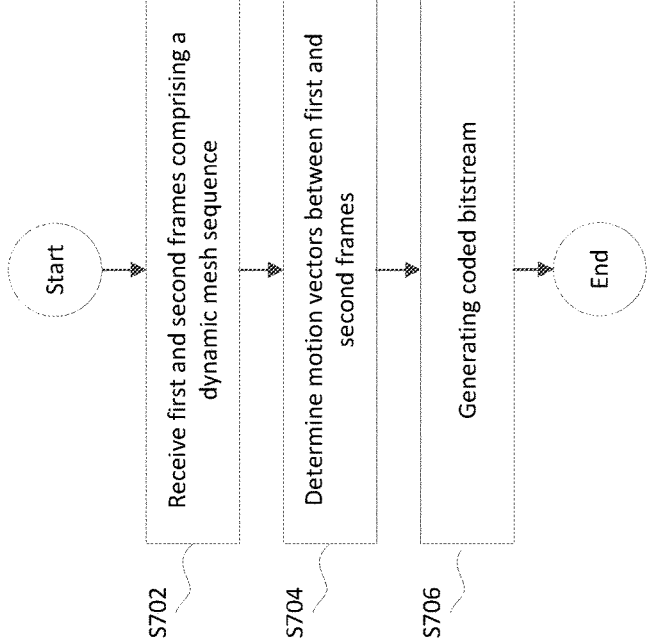
FIG. 7 illustrates a flowchart of a process performed by an encoder, in accordance with embodiments of the present disclosure.

FIG. 7 illustrates a flowchart of an example process 700 performed by an encoder. In one or more examples, the process 700 may be performed by the encoder 203.

The process 700 may start at operation S702 where first and second frames comprising a dynamic mesh sequence may be received. For example, the first and second frames may correspond to the reference frame 300 and the positionally tracked frame 302 in FIG. 3.

The process proceeds to operation S704 where each of the motion vectors between first and second frames are determined. The process proceeds to operation S706 where a coded bitstream is generated. The coded bitstream may indicate whether each vertex in the second frame is a duplicate of a vertex in the first frame (e.g., reference frame). The coded bitstream may indicate whether the duplicate removal mode is enabled. For example, the encoder may perform a statistical calculation on the first frame similar to the statistical calculation described for syntax 400 (FIG. 4) to determine whether to set a flag indicating that the duplicate removal mode is enabled.

The techniques, described above, may be implemented as computer software using computer-readable instructions and physically stored in one or more computer-readable media. For example, FIG. 8 shows a computer system 800 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 8:
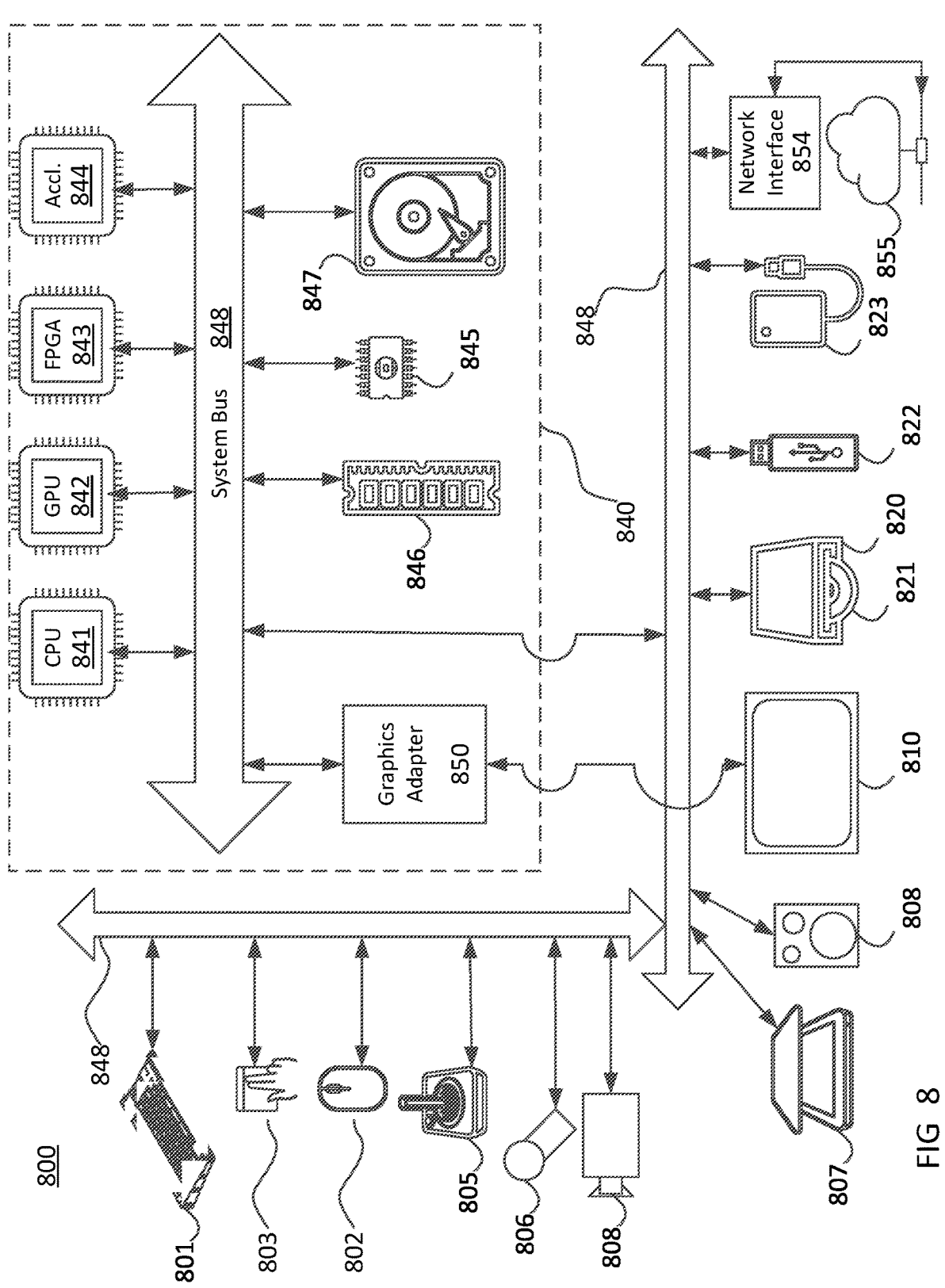
FIG. 8 is a diagram of a computer system suitable for implementing the embodiments of the present disclosure.

The components shown in FIG. 8 for computer system 800 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 800.

Computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 801, mouse 802, trackpad 803, touch screen 810, data-glove, joystick 805, microphone 806, scanner 807, camera 808.

Computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 810, data glove, or joystick 805, but there may also be tactile feedback devices that do not serve as input devices). For example, such devices may be audio output devices (such as: speakers 809, headphones (not depicted)), visual output devices (such as screens 810 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 800 may also include human accessible storage devices and their associated media such as optical media including CD/DVD ROM/RW 820 with CD/DVD or the like media 821, thumb-drive 822, removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 800 may also include interface to one or more communication networks. Networks may be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 849 (such as, for example USB ports of the computer system 800; others are commonly integrated into the core of the computer system 800 by attachment to a system bus as described below (for example Ethernet interface into a PC computer system or cellular network interface into a smartphone computer system). Using any of these networks, computer system 800 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 855. Certain protocols and protocol stacks may be used on each of those networks and network interfaces as described above.

Aforementioned human interface devices, human-accessible storage devices, and network interfaces 854 may be attached to a core 840 of the computer system 800.

The core 840 may include one or more Central Processing Units (CPU) 841, Graphics Processing Units (GPU) 842, specialized programmable processing units in the form of Field Programmable Gate Areas (FPGA) 843, hardware accelerators for certain tasks 844, and so forth. These devices, along with Read-only memory (ROM) 845, Random-access memory 846, internal mass storage such as internal non-user accessible hard drives, SSDs, and the like 847, may be connected through a system bus 848. In some computer systems, the system bus 848 may be accessible in the form of one or more physical plugs to enable extensions by additional CPUs, GPU, and the like. The peripheral devices may be attached either directly to the core's system bus 848, or through a peripheral bus 849. Architectures for a peripheral bus include PCI, USB, and the like. A graphics adapter 850 may be included in the core 840.

CPUs 841, GPUs 842, FPGAs 843, and accelerators 844 may execute certain instructions that, in combination, may make up the aforementioned computer code. That computer code may be stored in ROM 845 or RAM 846. Transitional data may be also be stored in RAM 846, whereas permanent data may be stored for example, in the internal mass storage 847. Fast storage and retrieve to any of the memory devices may be enabled through the use of cache memory, that may be closely associated with one or more CPU 841, GPU 842, mass storage 847, ROM 845, RAM 846, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 800, and specifically the core 840 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 840 that are of non-transitory nature, such as core-internal mass storage 847 or ROM 845. The software implementing various embodiments of the present disclosure may be stored in such devices and executed by core 840. A computer-readable medium may include one or more memory devices or chips, according to particular needs. The software may cause the core 840 and specifically the processors therein (including CPU, GPU, FPGA, and the like) to execute particular processes or particular parts of particular processes described herein, including defining data structures stored in RAM 846 and modifying such data structures according to the processes defined by the software. In addition or as an alternative, the computer system may provide functionality as a result of logic hardwired or otherwise embodied in a circuit (e.g., accelerator 844), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of decoding a dynamic mesh sequence, the method comprising:

receiving a coded bitstream comprising the dynamic mesh sequence in a first frame and a second frame that occurs later than the first frame;

reconstructing the dynamic mesh in the first frame;

determining, based on a statistical calculation performed to determine a percentage of vertices that are in the reconstructed first frame, whether a duplicate vertex removal mode is enabled in which a motion vector of a vertex in the dynamic mesh second that is a duplicate of a vertex in the dynamic mesh sequence in the first frame;

based on determining that the duplicate vertex removal mode is enabled, decoding a motion vector for each vertex in the second frame that is not a duplicate of a vertex in the reconstructed first frame; and reconstruct the dynamic mesh sequence in the second frame using the reconstructed dynamic mesh in the first frame and each decoded motion vector.

2. The method according to claim 1, wherein the duplicate vertex removal mode is enabled based on a determination that a percentage of duplicate vertices in the first reference frame is greater than or equal to a threshold.

3. The method of claim 1, further comprising:

based on determining that the duplicate vertex removal mode is not enabled, decoding a motion vector for each vertex in the second frame regardless of whether the vertex in the second frame is a duplicate of a vertex in the first frame.

4. The method of claim 1, wherein a vertex in the second frame is a duplicate of a vertex in the first frame based on a determination that the vertex in the second frame has the same coordinates as the vertex in the first frame.

5. The method of claim 1, wherein the coded video bitstream comprises a flag that indicates that the vertex in the second frame is a duplicate of a vertex in the first frame.

6. A method of encoding a dynamic mesh sequence, the method comprising:

receiving a first frame comprising the dynamic mesh sequence and a second frame comprising the dynamic mesh sequence, the second frame occurring after the first frame;

determining a motion vector between each vertex of the dynamic mesh sequence in the first frame and a corresponding vertex of the dynamic mesh sequence in the second frame;

generating a coded bitstream that includes each determined motion vector, an indication whether a vertex of the dynamic mesh sequence in the second frame is a duplicate of a vertex of the dynamic mesh sequence in the first frame, and an indication whether a duplicate vertex removal mode is enabled in which a motion vector of a vertex in the dynamic mesh sequence of the second frame that is a duplicate of a vertex in the dynamic mesh sequence in the first frame is skipped in a reconstruction of the second frame; and setting a flag indicating whether a duplicate removal mode is enabled based on a statistical calculation that determines a percentage of vertices of the dynamic mesh sequence in the first frame and vertices of the dynamic mesh sequence in the second frame that are duplicates, the flag included in the coded bitstream.

7. The method of claim 6, wherein the flag is set to enable the duplicate removal mode based on a determination that the percentage of vertices of the dynamic mesh sequence in the first frame and vertices of the dynamic mesh sequence in the second frame that are duplicates is greater than a threshold.

8. The method according to claim 6, wherein a motion vector for each vertex in the second frame is decoded based on a determination the duplicate vertex removal mode is not enabled regardless of whether the vertex in the second frame is a duplicate of a vertex in the first frame.

9. The method of claim 6, wherein a vertex in the second frame is a duplicate of a vertex in the first frame based on a determination that the vertex in the second frame has the same coordinates as the vertex in the first frame.

10. The method according to claim 6, wherein the coded bitstream includes a flag indicating whether a vertex of the dynamic mesh sequence in the second frame is a duplicate of a vertex of the dynamic mesh sequence in the first frame.

11. A method of processing a dynamic mesh sequence, the method comprising:

reconstructing a dynamic mesh sequence in a second frame that occurs after the first frame based on a coded bitstream that includes the first frame and the second frame, wherein the first frame is reconstructed, wherein the coded video bitstream includes an indication of whether a duplicate vertex removal mode is enabled in which a motion vector of a vertex in the dynamic mesh second that is a duplicate of a vertex in the dynamic mesh sequence in the first frame, wherein determining whether the duplicate vertex removal mode is enabled is based on a statistical calculation performed to determine a percentage of vertices that are in the reconstructed first frame, wherein based on determining that the duplicate vertex removal mode is enabled, a motion vector for each vertex in the second frame that is not a duplicate of a vertex in the reconstructed first frame is decoded, and wherein the dynamic mesh sequence in the second frame is reconstructed using the reconstructed first frame and each decoded motion vector.

12. The method according to claim 11, wherein the duplicate vertex removal mode is enabled based on a determination that a percentage of duplicate vertices in the first reference frame is greater than or equal to a threshold.

13. The method of claim 11, wherein determining whether the duplicate vertex removal mode is enabled is based on a determination that a flag in the coded bitstream indicates that the duplicate vertex removal mode is enabled.

14. The method of claim 11, wherein based on determining that the duplicate vertex removal mode is not enabled, a motion vector for each vertex in the second frame is decoded regardless of whether the vertex in the second frame is a duplicate of a vertex in the first frame.

15. The method of claim 1, wherein a vertex in the second frame is a duplicate of a vertex in the first frame based on a determination that the vertex in the second frame has the same coordinates as the vertex in the first frame.

* * * * *